Figure 2:
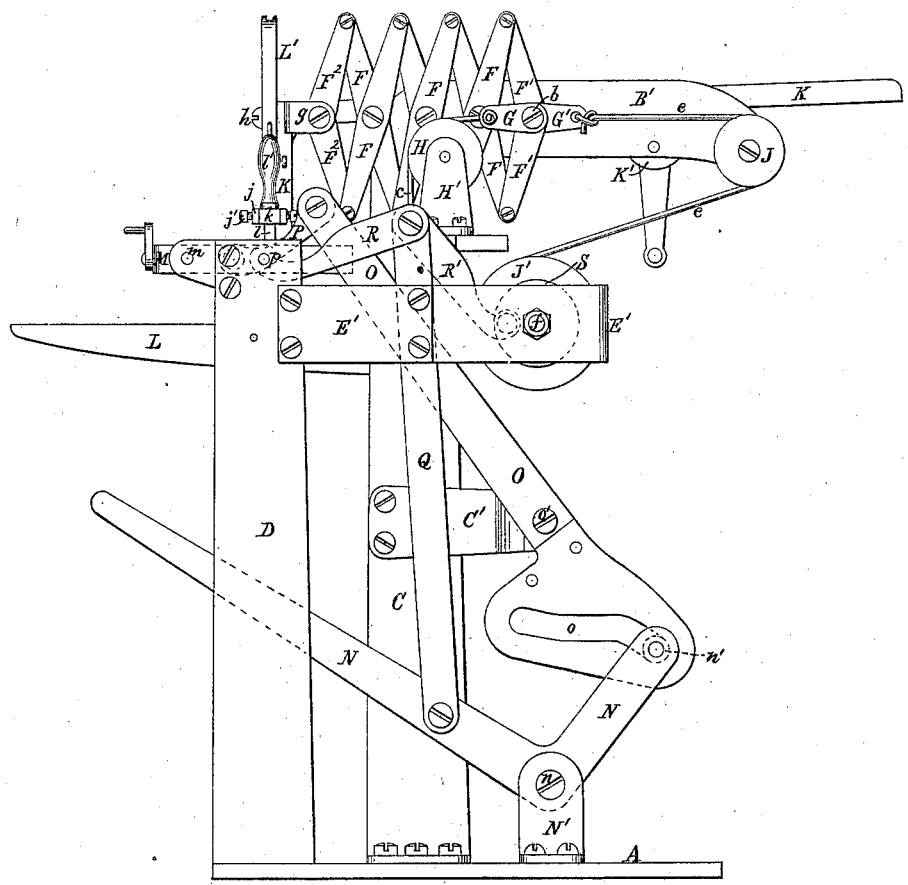

2 Sheets—Sheet 1.

R. C. LAMBERT.
Trimming and Burnishing Machine for Boots and Shoes.
No. 212,853. Patented Mar. 4, 1879.

Witnesses:
E. A. Hemmenway.
C. H. Dodd.

Inventor:
Richard C. Lambert
by N. C. Lombard
Attorney.

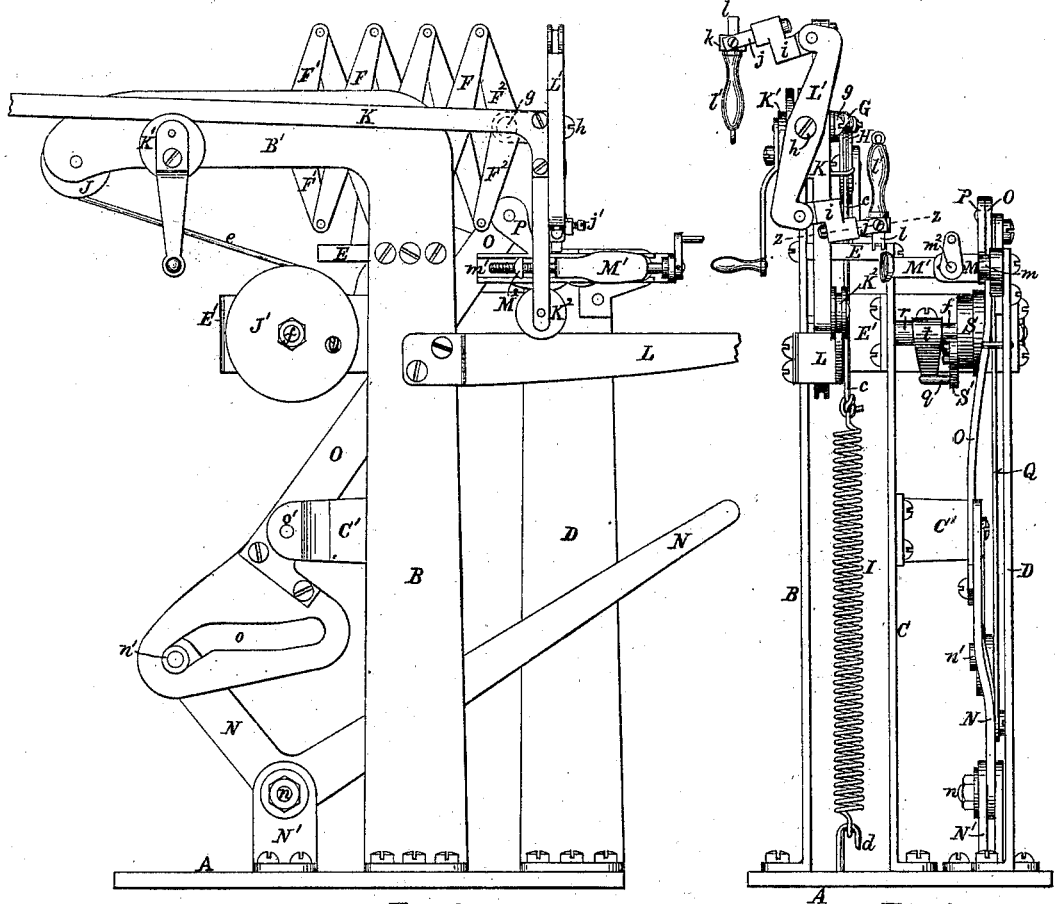

UNITED STATES PATENT OFFICE.

RICHARD C. LAMBERT, OF BRIDGEWATER, MASSACHUSETTS.

IMPROVEMENT IN TRIMMING AND BURNISHING MACHINES FOR BOOTS AND SHOES.

Specification forming part of Letters Patent No. 212,853, dated March 4, 1879; application filed August 30, 1878.

*To all whom it may concern:*

Be it known that I, RICHARD C. LAMBERT, of Bridgewater, in the county of Plymouth and State of Massachusetts, have invented certain new and useful Improvements in Sole-Edge Trimming and Burnishing Machines, of which the following, taken in connection with the accompanying drawings, is a specification.

My invention relates to a machine for trimming and burnishing the edges of boot and shoe soles, or that portion thereof usually called the "fore part," and has particular reference to the mechanism employed to produce the several motions desired to accomplish the necessary work; and it consists, first, in the use, in combination with a boot or shoe supporting jack adapted to be revolved about an axis, and a tool-carrier provided with suitable trimming or burnishing tools, of a series of vibrating levers, arranged in pairs, pivoted together at the centers of their lengths, and the several pairs pivoted together at their outer ends, so as to form what is generally called a "lazy-tongs," as a means of imparting to the trimming or burnishing tool an extended reciprocating motion in the direction of the length of the boot or shoe.

It further consists in pivoting the tool holder or carrier upon a lever mounted upon a horizontal axis, and adapted to be automatically vibrated thereon, to impart to the burnishing-tool a short reciprocating motion in the arc of a circle, while at the same time the axis about which said lever vibrates may be moved in a right line in such a manner as to cause said tool to traverse slowly the whole length of the sole-edge while the tool is making a great number of short quick vibrations in contact with the sole-edge.

It further consists in a peculiar arrangement of mechanism for imparting to the "jack" a semi-rotation, which will be best understood by reference to the description of the drawings, to be hereinafter given.

It further consists in a peculiar arrangement and method of hanging the cutting and burnishing tools, to be hereinafter described.

It further consists in the use, in combination with an operating-tool adapted to be moved in any desired direction relative to its carrier or holder, of a mechanism, substantially such as is hereinafter described, for imparting to said tool and carrier or holder an intermittent forward motion in the direction of the length of the supporting mechanism, which will be best understood by reference to the description of the drawings and to the claims.

It further consists in the use, in combination with an operating-tool adapted to be rotated about its axis, and inclined in any desired direction by the hand of the operator, of a mechanism, substantially as hereinafter described, for imparting to said operating-tool a series of successive short quick vibrations or reciprocations, and a mechanism for giving to said tool a steady slow forward movement through a given distance, with an interval of rest at the center of said movement, which will be best understood by reference to the description of the drawings and to the claims.

It further consists in the use, in combination with a jack adapted to be intermittently rotated, and a reciprocating operating-tool, of a peculiar clutch mechanism for controlling the forward movement of the operating-tool, as will be described.

Figure 1:
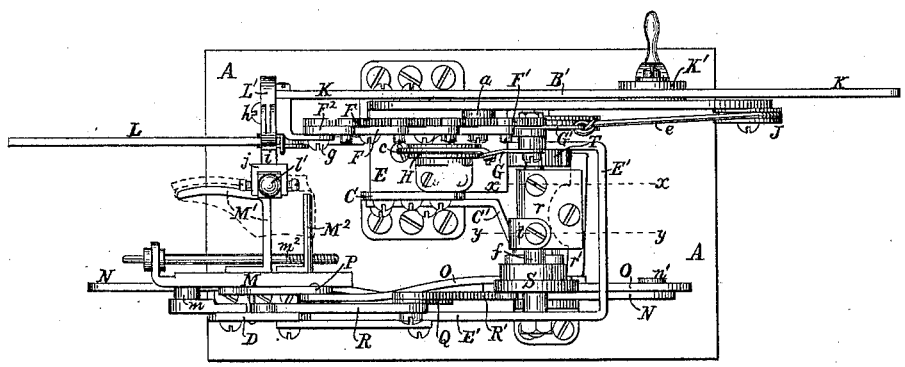

Figure 1 of the drawings is a plan of a machine embodying my invention. Fig. 2 is a side elevation. Fig. 3 is an end elevation. Fig. 4 is a rear elevation, with portions of the projecting parts broken away. Fig. 5 is a vertical section through the clutch on line $x\,x$ on Fig. 1, looking toward the rear. Fig. 6 is a similar section on line $y\,y$, Fig. 1, looking toward the front. Fig. 7 is a section on line $z\,z$ on Fig. 3, illustrating the method of hanging the operating-tool.

Figs. 5, 6, and 7 are drawn to a scale twice as large as the other figures.

A is a bed or base plate, from the upper side of which rise the standards B, C, and D, connected together by the plate E and frame E', as shown. The standard B is provided at its upper end with the laterally-projecting or horizontal arm B', to the front side of which is pivoted at $a$ the "lazy-tongs," so called, made up of a series of levers, F, and two pairs of links, F¹ and F², said levers being arranged in pairs, each pair being pivoted together at the centers of their lengths, and the several pairs pivoted together and to the links F¹ and F² at their ends, as shown. The inner ends of the links F¹ are pivoted together and to the links G and G' by the pivot-pin $b$.

A cord or chain, $c$, is attached at one end to the link G, and, after passing over the pulley H, supported in bearings in the stand H', bolted to the upper side of the plate E. Its other end is attached to the upper end of the spring I, the opposite end of which is attached to the hook $d$, set in the base-plate A, the tension of which spring tends to hold the lazy-tongs in its most contracted position. A cord, $e$, is attached by one end to the link G', and after passing over the pulley J, having its bearing upon a stud set in the outer end of the arm B', its other end is secured to the pulley J', secured upon the rear end of the shaft $f$, which has its bearings in the frame E'.

The inner ends of the links F² are pivoted together and to the angular lever K at $g$, around which pivotal point the lever K may be vibrated by the rotation of the eccentric K¹, or other equivalent device, by which the horizontal arm of said lever is supported and its position controlled.

The vertical arm of the lever K has mounted upon a stud set in its lower end a roll or truck, K², which rests upon and is adapted to roll along the upper edge of the horizontal arm L, thereby guiding and supporting the lazy-tongs as they are expanded, so as to cause said expansion to be substantially in a horizontal line.

L' is a tool-carrying lever, pivoted at the center of its length to the lever K by, and adapted to be vibrated or revolved about, the axial pin $h$, set in said lever K in a position at right angles to the pivot $g$, and to carry at either end thereof a trimming or burnishing tool, connected therewith by means of the link $i$, pivoted to said carrier-lever, the pivoted fork $j$, provided with screw-centers $j'$ $j'$, and the ring or perforated block $k$, mounted upon said centers, and embracing the shank of the tool $l$ between it and its handle $l'$, as shown.

M is the jack-frame, pivoted at $m$ to the upper end of the standard D, and having formed therewith or bolted thereto the angular plate M¹, adapted to enter the toe portion of the boot or shoe, and also provided with the movable arm M², fitted to, and adapted to be moved in, a groove or guideway, $m¹$, in the frame M by turning the screw-bolt $m²$, for the purpose of securing the boot or shoe firmly in position. The jack M remains in the position shown in the drawings until the operating-tool has traversed from the shank to the toe of the shoe, when its position is reversed by imparting to it a semi-rotation about the pivot $m$, while the forward motion of the operating-tool caused by the expansion of the lazy-tongs F F¹ F² ceases. This semi-rotation of the jack is obtained by depressing the movable end of the long arm of the lever N, pivoted at $n$ to the stand N', and carrying at the outer or movable end of its short arm an anti-friction roll, $n'$, which fits into and acts upon the cam-slot $o$, formed in the short arm of the lever O, pivoted at $o'$ to the bracket C', formed upon or secured to the standard C. The upper end of the lever O is connected by the link P to the jack M, and a movement of said lever about its axis, caused by the passage of the anti-friction roll $n'$ along the cam-shaped slot $o$, causes the jack M to rotate about its axis till its ends and the boot or shoe secured thereon are reversed.

Q is a connecting-rod, pivoted at one end to the treadle-lever N, and at its other end to the continuous ends of the links R and R', which, together, form a toggle, for imparting a partial rotary motion to the shaft $f$ and the pulley J', the other ends of said links R and R' being pivoted, respectively, to the upper end of the standard D at $p$, and to the hub or wheel S, mounted loosely upon the shaft $f$, and provided with the projecting arm S', in the outer end of which is set the pin $q$, and also having formed in its periphery a detent notch or recess, $q'$.

The shaft $f$ has secured thereto the two plates $r$ $r$, which project to one side thereof parallel with each other, and having pivoted thereto the lever $r'$, which extends both ways from said pivotal connection, and bears at one end upon the wheel S, and at the opposite end upon the hub or disk T, attached in a fixed position to the frame E', with its periphery concentric with the shaft $f$, and having formed in its periphery the detent notch or recess $s$, as shown in Fig. 5.

A spring, $t$, is secured by one end to the shaft $f$, with which the pin $q$ engages as the wheel S and arm S' are made to move around the shaft $f$, the office of said spring $t$ being to move the wheel S and arm S' back again to their first position after they have been moved by the toggle R R', and thus raise the outer or movable end of the long arm of the treadle-lever N when the operator's foot is removed therefrom.

This machine is designed to perform the operations of trimming and burnishing the edges of the fore parts of boot or shoe soles, and may be applied alternately to either of said operations at pleasure by simply changing the operating-tool or revolving the tool-carrier to bring the desired tool into the proper working position, it being understood that it is designed to attach an operating-tool to each end of the carrier-lever L', one of which may be a trimming-knife and the other a burnishing-tool.

The tools to be used are the common plane or trimming-knife and the ordinary edge setting and burnishing tool, substantially the same as the hand-tools now in common use; and as they form no part of my present invention, I have not considered it necessary to further illustrate or describe them.

What I claim as new, and desire to secure by Letters Patent of the United States, is—

1. The combination, in a machine for finishing the edges of boot and shoe soles, of a boot or shoe supporting jack adapted to be revolved about an axis, a tool holder or carrier provided with suitable trimming or burnishing tools, and the system of levers commonly called "lazy-tongs," adapted to impart to said tool-holder an extended movement in the direction of the length of the boot or shoe, substantially as described.

2. The combination, in a sole-edge-finishing machine, of the lever K, mounted upon and adapted to be vibrated about a movable axis, and the tool-carrying lever L', mounted upon and adapted to be vibrated about a horizontal axis, set in the lever K in a plane parallel with the plane of movement of the lever K, and mechanism adapted to impart to said lever K, and through it to the finishing-tool, a short, quick, vibratory motion about its axis, and at the same time to move said axis in a right line, to cause said short, quick, vibratory motion of the finishing-tool to be exerted successively upon all parts of the sole-edge, substantially as described.

3. The combination of the pivoted jack M, treadle-lever N, provided with the anti-friction rolls $n'$, the lever O, provided with the cam-shaped slot $o$, and link P, all arranged and adapted to operate substantially as described.

4. The combination of an operating-tool provided with a handle to be grasped by the hand of the operator, for the purpose of guiding it while in operation, the ring or perforated block $k$, the pivoted fork $j$, provided with the screw-centers $j'$ $j'$, link $i$, and the pivoted lever L', all constructed, arranged, and adapted to operate substantially as and for the purposes described.

5. The combination, in a machine for trimming or burnishing the edges of boot or shoe soles, of an operating-tool adapted to be moved in any desired direction relative to its carrier or holder by the hand of the operator, the system of lazy-tong levers F, links $F^1$ and $F^2$, cords or chains $c$ and $e$, pulleys H, J, and J', spring I, shaft $f$, provided with the plates $r$ $r$, lever $r'$, wheel S, disk T, toggle-links R and R', connecting-rod Q, and treadle-lever N, all arranged and adapted to operate substantially as and for the purposes described.

6. The combination, in a machine for finishing the edges of boot and shoe soles, of an operating-tool adapted to be rotated about its axis and inclined in any desired direction by the hand of the operator, the system of levers F, links $F^1$ and $F^2$, cords or chains $c$ and $e$, pulleys H, J, and J', spring I, shaft $f$, lever $r'$, wheel S, disk T, toggle-links R and R', connecting-rod Q, treadle-lever N, lever K, and eccentric $K^1$, all arranged and adapted to operate substantially as and for the purposes described.

7. The combination, in a machine for trimming or burnishing the edges of boot or shoe soles, of a jack adapted to be intermittently rotated, a reciprocating operating-tool, the shaft $f$, provided with the plates $r$ $r$, the pivoted lever $r'$, stationary or fixed hub or disk T, having formed in its periphery the recess $s$, and the wheel S, provided with the recess $q'$ and the arm S', and mounted loosely upon the shaft $f$ and adapted to be rotated, substantially as and for the purposes described.

Executed at Boston, Massachusetts, this 28th day of August, A. D. 1878.

RICHARD C. LAMBERT.

Witnesses:
N. C. LOMBARD,
E. A. HEMMENWAY.